3,049,554
9,11-DIHALOGENO-3,20-DIKETOPREGNANES AND PROCESSES FOR THEIR MANUFACTURE
David H. Gould, Leonia, and Hans Reimann, Bloomfield, N.J., assignors to Schering Corporation, Bloomfield, N.J., a corporation of New Jersey
No Drawing. Filed June 1, 1959, Ser. No. 817,048
9 Claims. (Cl. 260—397.3)

This invention relates to a novel class of halogenated steroids which are therapeutically useful. More specifically, our invention relates to a particular group of 9,11-dihalogenated pregnanes wherein the halogen atom at C–9 is at least as electronegative as the halogen substituent at C–11. By the term pregnane series we mean pregnanes containing the $\Delta^4$-3,20-diketo and $\Delta^{1,4}$-3,20 diketo systems.

Our novel compounds are of the group consisting of pregnanes having the following formula:

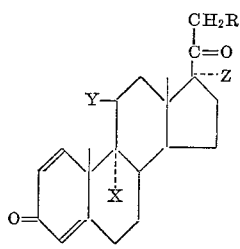

and the 1,2-dihydro analogs thereof, wherein R is a member of the group consisting of H, OH, and O-acyl, the acyl function being an acid radical of the group consisting of lower alkanoic acids having up to eight carbon atoms, dibasic organic acids having up to eight carbon atoms, and phosphate; Z is a member of the group consisting of H, OH and O-acyl, X and Y are halogen pairs of the group consisting of (F, F), (F, Cl), (F, Br) and (Cl, Br) respectively, and the 2α-methyl, 6α-methyl, 16-lower alkyl (α or β) analogs thereof.

Illustrative of the 21-esters falling within the foregoing are lower alkanoates such as acetate, propionate, t-butyl acetate, cyclopentyl propionate, and the like. Other esters are prepared from dibasic organic acids such as succinate, phthalate, sulfobenzoate and the like. Representative of the 17-esters are acetate, propionate, caproate and the like.

Our novel compounds having the 1,4-pregnadiene-17,21-diol system are glucocorticoids useful in the treatment of inflammatory conditions. They are especially useful in topical formulations such as creams or ointments. The corresponding 1,2-dihydro analogs also exhibit these properties but to a lesser extent and are more valuable as intermediates.

Those compounds of our invention which are devoid of oxygen at C–21 are active progestational agents which are specific in their action and from which is absent androgenic, estrogenic or corticoid activity. They are accordingly useful for conditions requiring progestational agents such as functional dysmenorrhea, premenstrual tension, habitual or threatened abortion, and the maintenance of pregnancy.

Our novel compounds are essentially devoid of systemic mineralo effects such as salt retention. Thus our novel compounds, containing a 9α-fluoro group or 9α-chloro group—heretofore believed to be potent salt retention factors are singularly devoid of such action and accordingly lend themselves to use in the conditions described above. The preferred compounds of our invention are the 9α,11β-difluoropregnenes and pregnadienes. The difluoro compounds of the general formula having a 17α,21-dihydroxy function and in particular a $\Delta^1$-bond are highly potent agents useful in the treatment of inflammations, burns and atopic dermatoses.

In our co-pending application Serial No. 743,492, filed June 20, 1958, now U.S. Patent No. 2,894,963, of which this application is a continuation-in-part, we described 9,11-dihalogeno-4-pregnene-17α,21-diol-3,20-diones and the corresponding 1,4-pregnadienes wherein the more electronegative atom appeared at C–11 in the case wherein the 9- and 11-substituent were different. Due to the limitations of the process described in said application, compounds containing fluorine at C–9, or in the case of a mixed dihalide compound containing the more electronegative atom at C–9, could not be prepared and were specifically disclaimed. We have now found methods for preparing such 9α-fluoro compounds and compounds containing the more electronegative halogen at C–9 as described by Formula I.

Our novel compounds are prepared either from a $\Delta^{9(11)}$-dehydro precursor or from a 9α-halo-11-hydroxy precursor; the choice depending upon the halogen atoms to be present in the final product.

In order to prepare the difluoro compound of our invention several routes are available. Starting with a $\Delta^{9(11)}$-pregnene such as 1,4,9(11) - pregnatriene - 17α,21-diol-3,20-dione 21-acetate and subjecting same to the action of a suitable fluorinating agent there is obtained the 9α,11β-difluoro analog. We have found agents such as lead tetrafluoride, lead dioxide in conjunction with hydrogen fluoride, iodosobenzene diacetate in conjunction with hydrogen fluoride to be useful in effecting the transformation. Other fluorinating agents such as antimony pentafluoride, iodine heptafluoride, and bromine trifluoride also are useful.

The reaction is usually carried out in an inert solvent at reduced temperatures, generally at −20° to −30° C. Representative of inert reactions solvents are chloroform, methylene chloride, and tetrahydrofuran and the like. Thus by our preferred method, 1,4,9(11)-pregnatriene-17α,21-diol-3,20-dione 21-acetate is reacted with lead tetrafluoride in chloroform at −30° C. and there is ultimately obtained 9α,11β-difluoro-1,4-pregnadiene-17α,21-diol-3,20-dione 21-acetate.

Alternatively, the two halogen atoms may be introduced in a sequence of two distinct reactions rather than through a simultaneous introduction. While this method is particularly valuable for diheterohalogenation such as in preparing a 9α-fluoro-11β-chloropregnene, it is equally applicable to homohalogenation such as in preparing a 9α-11β-difluoropregnene. By this route, a 9β,11β-oxidopregnene is treated with hydrohalic acid and there is obtained the corresponding 9α-halo-11β-hydroxy compound. The halohydrin is subjected to one of several reaction sequences described below whereby the 11β-hydroxy function is replaced by the desired 11β-halogen group.

In the direct replacement of an esterified 11-hydroxy group an inversion of the configuration at C–11 apparently occurs. Thus, in order to obtain an 11β-halogen via this route, it is necessary to start with an 11α-hydroxy function. Starting with a 9α-halogeno-11β-hydroxy compound prepared as described above, the desired 9α-halogeno-11α-hydroxy compound is obtained by oxidation to the 11-keto function, as for example with chromic acid, followed by stereospecific reduction. The stereospecific reduction to the α-configuration is preferably effected with sodium amalgam in alcohol and there is thus formed the 9α-fluoro-11α-hydroxy compound. Other reducing agents such as lead-sodium alloys are also useful.

To prevent reduction by the sodium amalgam and alcohol of ketonic functions other than that at C-11, the 3- and 20-keto groups of a 3,11,20-triketonic pregnene are preferably protected prior to reduction. The C-3-keto group is preferably protected by reacting with ethylene glycol in the presence of acid catalyst to form the 3-ethyleneketal. In those compounds where the 17α,21-dihydroxy-20-keto corticoid side chain is present, treatment with formaldehyde in the presence of a strong acid, results in formation of the 17(20),20(21)-bismethylenedioxy function. In those compounds possessing only the 20-keto or 17α-hydroxy-20-keto side chain, the 20-keto group is protected by formation of a 20-ethyleneketal concurrently to the formation of the 3-ethyleneketal. There is thus obtained as a result a 3,20-bisethyleneketal.

Thus, 9α-fluoro - 4 - pregnene-17α,21-diol-3,11,20-trione upon treatment with formaldehyde in the presence of p-toluenesulfonic, sulfuric, or hydrochloric acid yields 9α-fluoro-17(20),20(21)-bismethylenedioxy - 4 - pregnene-3,11-dione. Further, treatment with ethylene glycol in the presence of acid catalysts similar to those described above then yields 9α-fluoro-17(20),20(21)-bismethylenedioxy-5-pregnene-11-one-3-ethyleneketal.

Similarly, 9α-fluoro - 4 - pregnene-3,11,20-trione is treated with an axcess of ethylene glycol in the presence of an acid catalyst and there is obtained 9α-fluoro-5-pregnene-11-one-3,20-bisethyleneketal.

After reduction of the 11-keto function to 11α-hydroxyl as above described, the protective groups are cleaved by heating the compound in aqueous formic acid or acetic acid for periods of from ½ to 3 hours.

Since the 3-ethyleneketal formation apparently does not occur with 1,4-dienes, introduction of the 1,4-diene system when desired is preferably executed after reduction of the 11-keto group and cleavage of the protective groups and prior to the introduction of the halogen at C-11. The dehydrogenation is performed by any of the methods well known to the art of steroid chemistry. Thus, for example, 9α-fluoro-4-pregnene-11α,17α,21-triol-3,20-dione is subjected to the action of the microorganism Corynebacterium simplex according to the procedure analogous to that of U.S. Patent 2,837,464 and there is obtained 9α-fluoro-1,4-pregnadiene-11α,17α,21-triol-3,20-dione.

We prefer to esterify the 11α-hydroxy function prior to replacement by halogen and preferably employ the p-toluenesulfonate and methylsulfonate esters. A compound containing a free hydroxy group at C-21 in addition to one at C-11, is preferably selectively esterified at C-21 by conventional methods to prevent tosylation at this point. Thus, treatment of 9α-fluoro-1,4-pregnadiene-11α,17α,21-triol-3,20-dione with one equivalent of acetic anhydride in pyridine yields the 21-monoacetate. Further treatment with p-toluenesulfonyl chloride then yields the corresponding 11α-p-toluenesulfonate. Replacement by halogen is effected by reacting the tosylate with a suitable source of halide ion in an inert solvent. For example, upon treatment of the 11α-p-tosylate with lithium chloride in dimethylsulfoxide or dimethylformamide there is obtained 9α-fluoro-11β-chloro-1,4-pregnadiene-17α,21-diol-3,20-dione 21-acetate.

In a similar manner starting with the 11α-p-tosylate of a 9α-chloro-11α-hydroxy compound and treating same with lithium bromide in dimethylsulfoxide there is obtained the corresponding 9α-chloro-11β-bromo compound. There is obtained in this manner from 9α-chloro-1,4-pregnadiene-11α,17α,21-triol - 3,20 - dione-11p-toluenesulfonate 21-acetate, the compound 9α-chloro-11β-bromo-1,4-pregnadiene-17α,21-diol-3,20-dione 21-acetate.

Alternatively, the halogen at C-11 may be introduced through treatment of a 9α-fluoro-11α-amino-pregnane with a nitrosyl halide or of 9α-fluoro-11β-amino-pregnane with an alkyl nitrite followed by a hydrohalic acid. The requisite 9α-fluoro-11(α and β)-amino-pregnanes are prepared for example as follows:

Treatment of 9α-fluorocortisone with formaldehyde as described above yields 9α-fluoro-17(20),20(21)-bismethylenedioxy-4-pregnene-3,11-dione which upon catalytic reduction first with hydrogen and palladium catalyst in pyridine followed secondly with hydrogen and platinum catalyst affords 9α-fluoro-17(20),20(21)-bismethylenedioxypregnane-3-ol-11-one. This pregnanolone when treated according to the process analogous to that described in the copending application of Oliveto and Rausser, Serial No. 657,030, is converted to the 11-oxime and the oxime is then catalytically reduced to the two amino stereoisomers, 9α-fluoro-11α-amino-17α(20),20(21)-bismethylenedioxypregnane-3-ol and 9α-fluoro-11β-amino-17α(20),20-(21)-bismethylenedioxypregnane-3-ol. These two epimers are separated by chromatography.

The 9α-fluoro - 11α - aminopregnane is then treated with an appropriate nitrosyl halide, for example, nitrosyl chloride, whereupon there is obtained 9α-fluoro-11β-chloro-17α(20),20(21)-bismethylenedioxypregnane - 21-ol. The identical compound is obtained by treatment of the 11β-amino epimer with an alkyl nitrite, such as ethyl nitrite and hydrogen chloride. In both reactions a small amount of the 9α-fluoro-11α-chloropregnane is formed and is easily separated by chromatography.

While the foregoing describes the introduction of chlorine at the 11β-position, the fluoro and bromo analogs are similarly prepared by employing nitrosyl fluoride or nitrosyl bromide respectively. Similarly, the 11β-aminofunction may be replaced by the 11β-fluoro group through use of an alkyl nitrite and hydrogen fluoride.

The 9α,11β-dihalogeno - 17(20),20(21) - bismethylenedioxypregnane-3-ol thus obtained is submitted to chromic anhydride oxidation to form the corresponding 3-keto derivative and converted to the corresponding 4-pregnene and/or 1,4-pregnadiene by any of several methods well known in steroid chemistry. For example, bromination with one mole of bromine yields the 4-bromo analog which upon debromination with lithium chloride in dimethylformamide yields the 3-keto-4-pregnene. By subjecting this compound to the action of a microorganism such as Corynebacterium simplex there is obtained the corresponding 3-keto-1,4-pregnadiene.

The protective bismethylenedioxy function is removed by treatment with aqueous acid as heretofore described. For example, treatment of the compound described above with 60% formic acid, yields 9α-fluoro-11β-chloro-1,4-pregnadiene-17α,21-diol-3,20-dione.

It is apparent from the above that there exists a number of different ways in which our compounds may be prepared. For example, a 9α,11β-difluoro compound may be prepared by utilizing such starting materials and reagents as (1) a Δ$^{9(11)}$-steroid and lead tetrafluoride, (2) a Δ$^{9(11)}$-steroid and iodosobenzene diacetate and hydrogen fluoride, (3) a 9α-fluoro-11α-hydroxy steroid (as the 11-mesylate or 11-tosylate) and lithium fluoride in dimethylsulfoxide, (4) a 9α-fluoro-11α-amino-pregnene and nitrosyl fluoride, or (5) a 9α-fluoro-11β-aminopregnene and ethyl nitrite and hydrogen fluoride.

If not protected by other means, the reactive hydroxy group at C-21 is preferably protected prior to the halogenation by esterification, as for example, as the acetate. Thus, for example, 4,9(11)-pregnadiene-17α,21-diol-3,20-dione is treated with acetic anhydride to form the 21-acetate which is then fluorinated with lead dioxide and hydrogen fluoride to yield 9α,11β-difluoro-4-pregnene-17α,21-diol-3,20-dione 21-acetate.

The 9α,11β-dihalogeno-21-esters resulting from the processes outlined above are conveniently saponified to the corresponding alcohols either chemically by the use of dilute acid or base or microbiologically. Alternatively, a dihalogeno free alcohol prepared by our process is converted to an ester by the usual methods.

The following examples are illustrative of the procedures employed in preparing the compounds of this invention but are not to be construed as limiting the scope thereof, the scope of our invention being limited only by the appended claims.

EXAMPLE 1

*9α-Fluoro-11β-Bromo-4-Pregnene-17α,21-Diol-3,20-Dione 21-Acetate*

A. To a solution of 1.2 g. of 9α-fluoro-4-pregnene-17α, 21-diol-3,11,20-trione in 48 ml. of chloroform is added 12 ml. of 37% aqueous formaldehyde and 12 ml. of concentrated hydrochloric acid. The mixture is stirred with rapid agitation for 48 hours and at the end of this time the solution is extracted with chloroform and the extracts washed with water. After drying over magnesium sulfate, the chloroform solution is evaporated to a residue and upon recrystallization of the residue from acetone-hexane, there is obtained 9α-fluoro-17(20),20(21)-bis-methylenedioxy-4-pregnene-3,11-dione M.P. 290–295° C.

Four hundred milligrams of the bismethylenedioxy compound so obtained is dissolved in 40 ml. of benzene and to the solution is added 1.6 ml. of ethylene glycol and 40 mg. of p-toluenesulfonic acid. The mixture is refluxed for 24 hours and at the end of this time allowed to attain room temperature. The solution is then extracted with chloroform and chloroform extracts washed with water. The solution is then dried over magnesium sulfate and the solvent removed by evaporation in vacuo. Recrystallization of the residue from acetone-hexane then yields the compound of this example, 9α-fluoro-17(20),20(21)-bismethylenedioxy-5-pregnene-11-one-3-ethyleneketal.

B. A solution of 1 g. of 9α-fluoro-17(20),20(21)-bis-methylenedioxy-5-pregnene-11-one-3-ethyleneketal is dissolved in 20 ml. of 95% ethanol and 20 ml. of tetrahydrofuran. The solution is cooled to −20° C. and to it is added in several small portions 11.4 g. of 3% sodium amalgam. At the end of the reaction as indicated by the cessation of gas evolution, the residual metal is removed by filtration and to the filtrate is added 20 ml. of water. The solid material which is thus formed is collected by filtration and washed well with water. The crude product, consisting essentially of 9α-fluoro-17(20),20(21)-bis-methylenedioxy-5-pregnene-11α-ol-3-ethyleneketal is heated on a steam bath with 20 ml. of 60% formic acid for 1½ hours. At the end of this time, the solution is cooled and water is added to precipitate a solid. The solid is collected by filtration, and recrystallized from acetone-hexane to yield 9α-fluoro-4-pregnene-11α,17α,21-triol-3,20-dione.

C. One gram of 9α-fluoro-4-pregnene-11α,17α,21-triol-3,20-dione is dissolved in 20 ml. of pyridine and to the solution is added 0.28 g. of acetic anhydride. The solution is allowed to stand at 0° C. for three hours and then poured into ice and hydrochloric acid. A solid precipitates and is collected by filtration, then crystallized from aqueous methanol to yield 9α-fluoro-4-pregnene-11α,17α, 21-triol-3,20-dione 21-acetate.

D. One gram of 9α-fluoro-4-pregnene-11α,17α,21-triol-3,20-dione 21-acetate is dissolved in 4 ml. of chloroform and 5 ml. of dry pyridine and the solution chilled in ice. To the chilled solution is added 1.2 g. of p-toluenesulfonyl chloride in small portions and the reaction mixture stirred for 90 minutes, and then allowed to stand at room temperature for 20 hours. At the end of this time the mixture is poured with rapid stirring into ice-water and then extracted with chloroform. The chloroform extracts are washed with water, dried and then concentrated to a residue under reduced pressure. The residue is then crystallized from acetone-hexane to yield 9α-fluoro-4-pregnene-11α,17α,21-triol-3,20-dione-11α-p-tosylate 21-acetate.

E. To a solution of 500 mg. of 9α-fluoro-4-pregnene-11α,17α,21-triol-3,20-dione-11α-p-tosylate 21-acetate in 40 ml. of dimethylsulfoxide is added 3.0 g. of lithium bromide. The reaction mixture is stirred at 90° for 15 hours and then poured into ice-water. The solid material is collected by filtration, washed well with water, dried, dissolved in acetone and crystallized by addition of hexane to yield the product of this example, 9α-fluoro-11β-bromo-4-pregnene-17α,21-diol-3,20-dione 21-acetate.

EXAMPLE 2

*9α-Fluoro-11β-Bromo-1,4-Pregnadiene-17α,21-Diol-3,20-Dione 21-Acetate*

9α-fluoro-4-pregnene-17α,21-diol-3,11,20-trione is treated as described in Examples 1A and 1B. The compound thus obtained, 9α-fluoro-4-pregnene-11α,17α,21-triol-3,20-dione is dehydrogenated by subjecting it to the action of the microorganism *Corynebacterium simplex* according to the procedure of U.S. Patent 2,837,464. There is thus obtained as a crystalline solid, 9α-fluoro-1,4-pregnadiene-11α,17α,21-triol-3,20-dione.

This compound is then reacted according to the procedures of Examples 1C, 1D and 1E. There is thus obtained the compound of this example, 9α-fluoro-11β-bromo-1,4-pregnadiene-17α,21-diol-3,20-dione 21-acetate.

EXAMPLE 3

*9α-Fluoro-11β-Chloro-4-Pregnene-17α,21-Diol-3,20-Dione 21-Acetate*

By substituting lithium chloride for lithium bromide in part E of Example 1 and treating 9α-fluoro-4-pregnene-11α,17α,21-triol-3,20-dione-11α-p-tosylate 21-acetate as therein described, there is obtained the compound of this example, 9α-fluoro-11β-chloro-4-pregnene-17α,21-diol-3,20-dione 21-acetate.

EXAMPLE 4

*9α-Fluoro-11β-Chloro-1,4-Pregnadiene-17α,21-Diol-3,20-Dione 21-Acetate*

The procedure as described in Example 2 for 9α-fluoro-11β-bromo-1,4-pregnadiene-17α,21-diol-3,20-dione 21-acetate is followed to prepare the compound of this example with the exception of lithium chloride being substituted for lithium bromide in step E of Example 1. There is thus obtained 9α-fluoro-11β-chloro-1,4-pregnadiene-17α, 21-diol-3,20-dione 21-acetate.

EXAMPLE 5

*9α-Chloro-11β-Bromo-4-Pregnene-17α,21-Diol-3,20-Dione 21-Acetate*

A. One gram of 9α-chloro-4-pregnene-11β,17α,21-triol-3,20-dione 21-acetate is treated with 1 g. of chromium trioxide in 15 ml. of acetic acid and 3 ml. of water at 20° C. for 3 hours. Upon diluting the reaction mixture with 200 ml. of water and filtering the solid thereby formed, there is obtained 9α-chloro-4-pregnene-17α,21-diol-3,11, 20-trione 21-acetate.

B. This compound is then subjected to the reaction sequence described in Example 1. There is thus obtained 9α - chloro - 11β - bromo - 4 - pregnene-17α,21-diol-3,20-dione 21-acetate.

EXAMPLE 6

*9α-Chloro-11β-Bromo-1,4-Pregnadiene-17α,21-Diol-3,20-Dione 21-Acetate*

The intermediate prepared in Example 5A, 9α-chloro-4-pregnene-17α,21-diol-3,11,20-trione 21-acetate, is subjected to the procedure of Example 2. There is thus obtained the compound of this example, 9α-chloro-11β-bromo-1,4-pregnadiene-17α,21-diol-3,20-dione 21-acetate.

EXAMPLE 7

*9α,11β-Difluoro-1,4-pregnadiene-17α,21-Diol-3,20-Dione 21-Acetate*

A. To a solution of 1.0 g. of 1,4,9(11)-pregnatriene-

17α,21-diol-3,20-dione 21-acetate in 40 ml. of chloroform, chilled to −30° C. in a Dry Ice-acetone bath, is added with stirring 750 mg. of lead tetrafluoride. The mixture is stirred in the cold for 18 hours, then filtered. The filtrate is evaporated to a residue and the residue chromatographed on magnesium silicate. The material eluted with 60% ether-in-hexane to 100% ether is combined and crystallized from acetone-hexane. There is thus obtained the compound of this example, 9α,11β-difluoro-1,4-pregnadiene-17α,21-diol-3,20-dione 21-acetate.

B. Alternatively, a solution of 1.0 g. of 1,4,9(11)-pregnatriene-17α,21-diol-3,20-dione 21-acetate in a mixture of 20 ml. of tetrahydrofuran and 30 ml. of chloroform, containing 630 mg. of finely powdered lead dioxide, is chilled to −20° C. There is then added dropwise with vigorous stirring a solution of 680 mg. of hydrogen fluoride in 5 ml. of chloroform-tetrahydrofuran. The mixture is stirred in the cold for five hours, then diluted with water and rendered basic by addition of sodium carbonate and stirring for 15 minutes. The organic layer is separated, evaporated to a residue and purified by chromatography as described in Example 7A.

C. Alternatively a solution of 850 mg. of iodosobenzene diacetate in 40 ml. of methylene chloride is chilled to −20° C. and added to 1.0 g. of 1,4,9(11)-pregnatriene-17α,21-diol-3,20-dione 21-acetate in 20 ml. of methylene chloride. Gaseous hydrogen fluoride is bubbled into the stirred solution for five minutes. The reaction mixture is stirred at −20° C. to −15° C. for 6 hours, then poured into aqueous sodium carbonate with vigorous stirring. The organic layer is separated and evaporated and purified by chromatography as described in Example 7A.

D. Alternatively, by following the procedure of Example 2 and substituting lithium fluoride for lithium bromide, there is obtained the compound of this example.

EXAMPLE 8

*9α,11β-Difluoro-4-Pregnene-17α,21-Diol-3,20-Dione 21 Acetate*

By substituting 4,9(11)-pregnadiene-17α,21-diol-3,20-dione 21-acetate in any of the procedures, Examples 7A, 7B, or 7C, there is obtained the compound of this example, 9α,11β-difluoro-4-pregnene-17α,21-diol-3,20-dione 21-acetate.

Alternatively, by substituting lithium fluoride for lithium bromide in part E of Example 1, there is obtained the compound of this example.

EXAMPLE 9

*6α-Methyl-9α,11β-Difluoro-1,4-Pregnadiene-17α,21-Diol-3,20-Dione 21-Acetate*

6α-methyl-1,4-9(11)-pregnatriene-17α,21-diol-3,20-dione 21-acetate is reacted with lead tetrafluoride according to Example 7A. There is thus obtained the compound of this example, 6α-methyl-9α,11β-difluoro-1,4-pregnadiene-17α,21-diol-3,20-dione 21-acetate.

Alternatively, the fluorinating procedures of Examples 7B or 7C may be used to prepare the compound of this example.

EXAMPLE 10

*2α-Methyl-9α,11β-Difluoro-4-Pregnene-17α,21-Diol-3,20-Dione 21-Acetate*

2α-methyl-4,9(11)-pregnadiene-17α,21-diol-3,20-dione 21-acetate is subjected to the action of lead tetrafluoride according to the procedure of Example 7A and there is thus obtained the compound of this example 2α-methyl-9α,11β-difluoro-4-pregnene-17α,21-diol-3,20-dione 21-acetate.

EXAMPLE 11

*9α,11β-Difluoro-16α-Methyl-1,4-Pregnadiene-17α,21-Diol-3,20-Dione 21 Acetate*

To a solution of 3 g. of 16α-methyl-1,4-pregnadiene-11β,17α,21-triol-3,20-dione 21-acetate in 20 ml. of pyridine there is added 1 ml. of methanesulfonyl chloride in 20 ml. of pyridine and 20 ml. of dimethylformamide. The solution is heated for one hour at 60°–80° C., allowed to cool, then poured into ice-hydrochloric acid. The solid which precipitates is filtered, washed with water and then recrystallized from acetone to give 16α-methyl-1,4,9(11)-pregnatriene-17α,21-diol-3,20-dione 21-acetate.

This compound is then treated with lead tetrafluoride in the manner of Example 7A and there is obtained upon purification as therein described 9α,11β-difluoro-16α-methyl-1,4-pregnadiene-17α,21-diol-3,20-dione 21-acetate.

EXAMPLE 12

*9α,11β-Difluoro-16β-Methyl-1,4-Pregnadiene-17β,21-Diol-3,20-Dione 21-Acetate*

The requisite intermediate, 16β-methyl-1,4-pregnadiene-11β,17α,21-triol-3,20-dione 21-acetate is treated according to the reaction sequence of Example 11 and there is thus obtained 9α,11β-difluoro-16β-methyl-1,4-pregnadiene-17β,21-diol-3,20-dione 21-acetate.

EXAMPLE 13

*9α-Fluoro-11β-Chloro-1,4-Pregnadiene-17α,21-Diol-3,20-Dione*

A solution of 9α-fluoro-11β-chloro-1,4-pregnadiene-17α,21-diol-3,20-dione 21-acetate (the compound of Example 4) in 50 ml. of 3:1 methanol-chloroform mixture is chilled in ice and to it is added 60 ml. of 0.1 N sodium hydroxide solution. The mixture is stirred at 0° C. for 10 minutes, then diluted with water and extracted with methylene chloride. Evaporation of the solvent and recrystallization of the residue from acetone-hexane affords the product of this example, 9α-fluoro-11β-chloro-1,4-pregnadiene-17α,21-diol-3,20-dione.

In a similar fashion the other 21-acetates prepared above may be saponified to the free 21-hydroxyl compounds. Thus by following the procedure described in this example, there is prepared from the compounds prepared above:

9α-fluoro-11β-bromo-4-pregnene-17α,21-diol-3,20-dione;
9α-fluoro-11β-bromo-1,4-pregnadiene-17α,21-diol-3,20-dione;
9α-fluoro-11β-chloro-4-pregnene-17α,21-diol-3,20-dione;
9α-chloro-11β-bromo-4-pregnene-17α,21-diol-3,20-dione;
9α-chloro-11β-bromo-1,4-pregnadiene-17α,21-diol-3,20-dione;
9α,11β-difluoro-1,4-pregnadiene-17α,21-diol-3,20-dione;
9α,11β-difluoro-4-pregnene-17α,21-diol-3,20-dione;
6α-methyl-9α,11β-difluoro-1,4-pregnadiene-17α,21-diol-3,20-dione;
2α-methyl-9α,11β-difluoro-4-pregnene-17α,21-diol-3,20-dione;
9α,11β-difluoro-16α-methyl-1,4-pregnadiene-17α,21-diol-3,20-dione;
9α,11β-difluoro-16β-methyl-1,4-pregnadiene-17α,21-diol-3,20-dione.

EXAMPLE 14

*9α-Fluoro-11β-Chloro-1,4-Pregnadiene-17α-ol-3,20-Dione*

A solution of 12 g. of 9α-fluoro-11β-chloro-1,4-pregnadiene-17α,21-diol-3,20-dione (prepared in Example 13) in 100 ml. of dry pyridine is chilled in a Dry Ice-acetone bath and there is added a solution of 6 g. of p-toluenesulfonyl chloride in 50 ml. of methylene chloride. The mixture is stirred in the cold bath for 2 hours and then kept at −20° C. for 24 hours. At the end of this time, the reaction mixture is diluted with methylene chloride and the solution washed first with water, then with 10% sulfuric acid, 10% sodium bicarbonate, very dilute hydrochloric acid and finally with water. The solution is dried over magnesium sulfate, filtered and concentrated to a residue which is dissolved in acetone. The acetone solution is warmed on the steam bath, decolorizing carbon added, and the solution filtered. To the clarified solution there is added a warm solution of 10 g. of sodium iodide in acetone. After heating this mixture on the steam bath for five minutes, three milliliters of acetic acid are added, and the mixture is warmed before adding aqueous sodium bisulfite. The solution is poured into water and the resulting precipitate filtered and washed with water. Recrystallization of the solid from acetone-ether yields 9α-fluoro-11β-chloro-1,4-pregnadiene-17α-ol-3,20-dione.

EXAMPLE 15

*9α,11β-Difluoro-1,4-Pregnadiene-17α-ol-3,20-Dione*

1,4,9(11)-pregnatriene-17α-ol-3,20-dione is fluorinated with lead tetrafluoride according to the procedure as described in Example 7A. There is thus obtained 9α,11β-difluoro-1,4-pregnadiene-17α-ol-3,20-dione.

Similarly the compound of this example is prepared according to the procedures of 7B or 7C from 1,4,9(11)-pregnatriene-17α-ol-3,20-dione.

Alternatively, 9α,11β - difluoro-1,4-pregnadiene-17α,21-diol-3,20-dione (prepared in Example 13) is subjected to the reaction sequence of Example 14 and there is obtained the compound of this example.

EXAMPLE 16

*9α,11β-Difluoro-1,4-Pregnadiene-3,20-Dione*

1,4,9(11)-pregnatriene-3,20-dione is treated with lead tetrafluoride according to the procedure of Example 7A. There is thus obtained the compound of this example, 9α,11β-difluoro-1,4-pregnadiene-3,20-dione.

The fluorination is also effected by the alternate procedures described in Examples 7B and 7C.

EXAMPLE 17

*9α-Fluoro-11β-Chloro-4-Pregnene-3,20-Dione*

A. Three grams of 9α-fluoro-4-pregnene-3,11,20-trione in 100 ml. of dry benzene and 40 ml. of ethylene glycol are refluxed for 22 hours in a Dean-Stark separator in the presence of 50 mg. of p-toluenesulfonic acid. After addition of 60 mg. of sodium hydroxide in 2 ml. of methanol, the reaction mixture is diluted with water and the organic layer separated. The benzene layer is then washed with 5% aqueous sodium bicarbonate and then water and concentrated in vacuo to a residue which is crystallized from benzene-hexane to yield 9α-fluoro-5-pregnene-11-one-3,20-bisethyleneketal.

B. The compound prepared in part A of this example is treated according to the procedure of Example 1B and the product so obtained treated according to the procedure of Example 1D to yield 9α-fluoro-4-pregnene-11α-ol-3,20-dione-21-p-tosylate.

C. The compound thus prepared in Example 17B is treated in the manner of Example 1E with the exception that lithium chloride is substituted for lithium bromide. There is thus obtained the compound of this example, 9α-fluoro-11β-chloro-4-pregnene-3,20-dione.

EXAMPLE 18

*6α-Methyl-9α,11β-Difluoro-1,4-Pregnadiene-17α-ol-3,20-Dione*

6α - methyl - 9α,11β-difluoro-1,4-pregnadiene-17α,21-diol-3,20-dione (prepared in Example 13) is subjected to the reaction sequence as described in Example 14. There is thus obtained upon purification as therein described 6α-methyl-9α,11β-difluoro-1,4-pregnadiene-17α-ol-3,20-dione.

EXAMPLE 19

*9α,11β-Difluoro-1,4-Pregnadiene-17α,21-Diol-3,20-Dione 21-Propionate*

To 1.0 g. 9α,11β-difluoro-1,4-pregnadiene-17α,21-diol-3,20-dione prepared as in Example 13, there is added 1 ml. of propionic anhydride in 10 ml. of dry pyridine. The reaction mixture is left at room temperature for 3 hours, then is poured with stirring into ice-water. The resulting precipitate is filtered, washed with water and crystallized from acetone-hexane to give 9α-11β-difluoro-1,4-pregnadiene-17α,21-diol-3,20-dione 21-propionate.

Similarly other 21-lower alkanoyl esters may be prepared by reacting the appropriate lower alkanoic acid anhydride with the free 21-hydroxy compound, as for example, 9α - chloro-11β-bromo-1,4-pregnadiene-17α,21-diol-3, 20-dione 21-butyrate.

EXAMPLE 20

*9α,11β-Difluoro-1,4-Pregnadiene-17α,21-Diol-3,20-Dione 21-t-Butylacetate*

9α,11β - difluoro - 1,4-pregnadiene-17α,21-diol-3,20-dione (5 g.), (prepared as in Example 13) is dissolved in 100 ml. of pyridine, the solution is cooled to below 10° C., and tertiary butylacetylchloride (1.5 g.) added. The mixture is stirred at room temperature for 16 hours, then poured into cold, dilute, sulfuric acid. The precipitate which forms is filtered, washed with water, and crystallized from acetone to give 9α,11β-difluoro-1,4-pregnadiene-17α,21-diol-3,20-dione 21-t-butylacetate.

EXAMPLE 21

*9α-Fluoro-11β-Chloro-1,4-Pregnadiene-17α,21-Diol-3,20-Dione 21-Hemisuccinate*

9α - fluoro-11β-chloro-1,4-pregnadiene-17α,21-diol-3,20-dione (5 g.), (prepared as in Example 14) is dissolved in pyridine (100 ml.) and succinic anhydride (5 g.) added. The reaction mixture is stirred 20 hours at room temperature, then is diluted with ice-water and acidified with cold, dilute sulfuric acid. The precipitate which forms is filtered, washed with water, dried, and crystallized with acetone-water to yield 9α-fluoro-11β-chloro-1,4-pregnadione-17α,21-diol-3,20-dione 21-hemisuccinate.

EXAMPLE 22

*9α,11β-Difluoro-1,4-Pregnadiene-17α,21-Diol-3,20-Dione 21-Phosphate*

To a solution of 1 gram of 1,4-pregnadiene-11β,17α,21-triol-3,20-dione 21-phosphate in 40 ml. of glacial acetic acid there is added, under an atmosphere of nitrogen, 8 ml. of 5.5 N-anhydrous hydrogen bromide in glacial acetic acid. The solution is allowed to stand at room temperature for twenty minutes and then is evaporated in vacuo to a residue substantially of 1,4,9(11)-pregnatriene-17α, 21-diol-3,20-dione 21-phosphate. This residue is then treated with lead dioxide and hydrogen fluoride in the manner of Example 7B. There is thus obtained the compound of this example 9α,11β-difluoro-1,4-pregnadiene-17α,21-diol-3,20-dione 21-phosphate.

EXAMPLE 23

*9α,11β - Difluoro - 1,4 - Pregnadiene - 17α - Ol - 3,20 - Dione-17-Acetate*

A solution of 1 g. of 9α,11β-difluoro-1,4-pregnadiene-17α-ol-3,20-dione (prepared as in Example 15) is dissolved in 10 ml. of glacial acetic acid and 2 ml. of trifluoroacetic anhydride. The solution is left at room temperature for 24 hours then poured into ice-water. A solid separates which is filtered, washed with water and crystallized from acetone hexane to give 9α,11β-difluoro-1,4-pregnadiene-17α-ol-3,20-dione 17-acetate.

Similarly other 17-acetates are prepared according to the above method, as for example, 6α-methyl-9α,11β-difluoro-1,4-pregnadiene-17α-ol-3,20-dione 17-acetate; 9α-fluoro-11β-chloro-1,4-pregnadiene-17α-ol-3,20-dione 17-acetate.

In an analogous fashion, other esters are obtained by substituting the appropriate carboxylic acid for acetic acid in the above procedure. There is thus prepared, 9α,11β-difluoro-1,4-pregnadiene-17α-ol - 3,20 - dione 17-butyrate; 9α- fluoro - 11β-chloro-1,4-pregnadiene-17α-ol-3, 20-dione 17-(β-cyclopentylpropionate); 9α,11β-difluoro-1,4-pregnadiene-17α-ol-3,20-dione 17-caproate.

We claim:
1. Compounds selected from the group consisting of steroids having the formula:

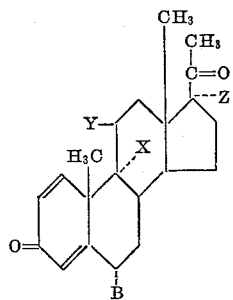

and the 1,2-dihydro analogs thereof, wherein B is a member of the group consisting of hydrogen and methyl; X and Y are halogen pairs of the group consisting of (F, F), (F, Cl), (F, Br), and (Cl, Br) respectively; and Z is a member of the group consisting of H, OH, and lower alkanoyloxy.

2. 9α - fluoro - 11β - chloro - 1,4 - pregnadiene - 17α - ol - 3,20 - dione.

3. 9α,11β - difluoro - 1,4 - pregnadiene - 17α - ol - 3,20 - dione.

4. 9α,11β-difluoro-1,4-pregnadiene-3,20-dione.

5. 9α,11β - difluoro - 1,4 - pregnadiene - 17α - ol - 3,20-dione 17-acetate.

6. 9α,11β - difluoro - 1,4 - pregnadiene - 17α - ol - 3,20-dione 17-caproate.

7. The process for preparing 9α,11β-difluoro-steroids of the pregnane series which comprises reacting a $\Delta^{9(11)}$-pregnene with a member of the group consisting of lead tetrafluoride, lead dioxide plus hydrogen fluoride, and iodosobenzene diacetate plus hydrogen fluoride; in an inert organic solvent and isolating the 9α,11β-difluoro-product thereby formed.

8. The process for preparing 9α,11β-dihalogeno steroids of the pregnane series wherein said 9α-halogeno is at least as electronegative as said 11β-halogeno, which comprises reacting a 9α-halogeno-11α-sulfonic acid ester with halide ion in an inert solvent, said 9α-halogeno having an electronegativity at least as great as said halide ion.

9. The process for preparing a 9α-fluoro-11β-chloro steroid of the pregnane series which comprises reacting a 9α-fluoro-11α-tosylate steroid of the pregnane series with lithium chloride in an inert polar solvent.

References Cited in the file of this patent
UNITED STATES PATENTS
2,894,963   Gould et al. _____ July 14, 1959

OTHER REFERENCES
Oliveto et al.: J. Am. Chem. Soc. 75, 488 (1953).
Fried et al.: J. Am. Chem. Soc. 75, 2273 (1953).